No. 808,080. PATENTED DEC. 26, 1905.
E. FRANTZICH.
BUNDLE CARRYING DEVICE.
APPLICATION FILED APR. 7, 1905.
2 SHEETS—SHEET 1.
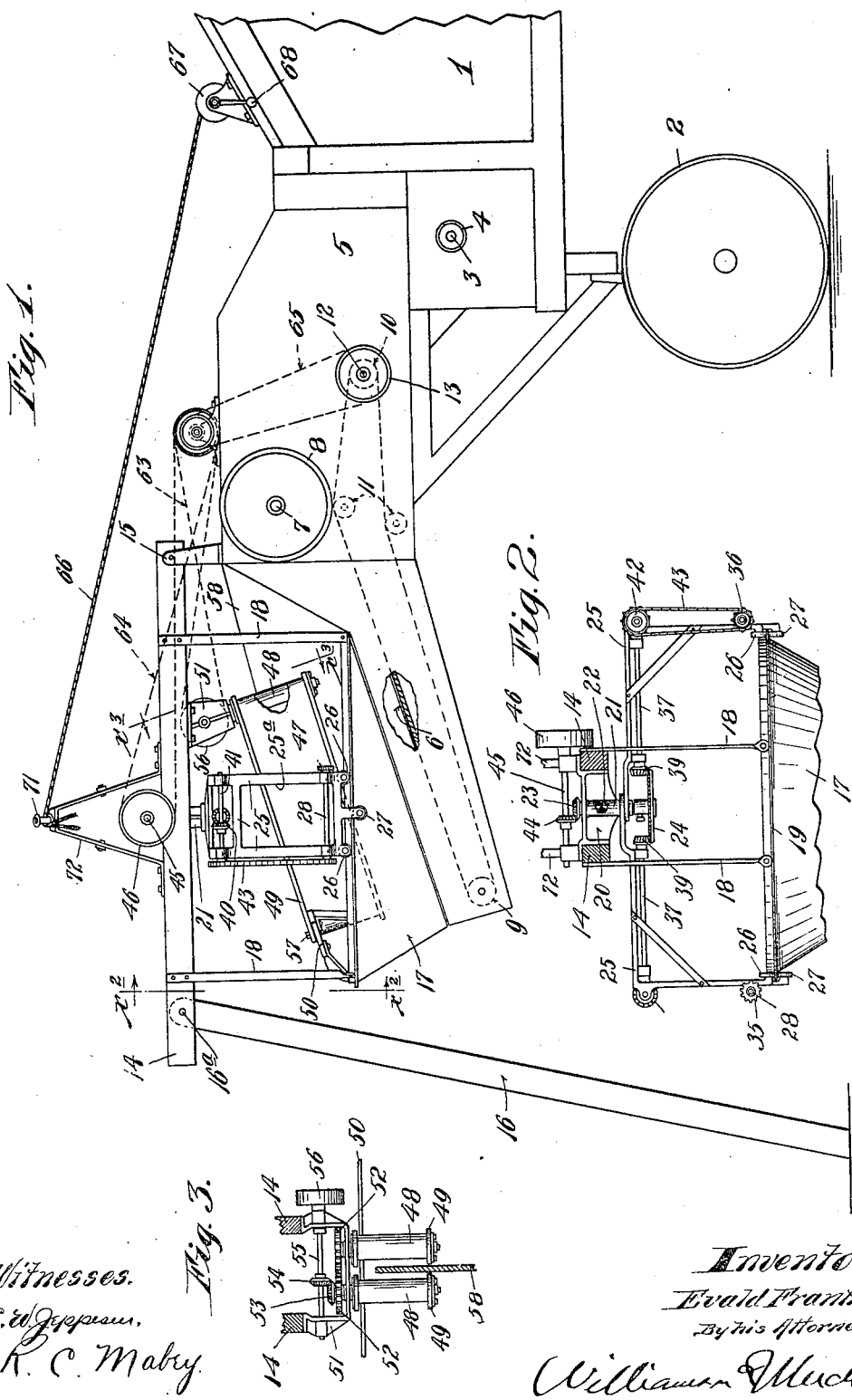
Witnesses.
E. W. Jeppesen.
R. C. Mabry.
Inventor:
Evald Frantzich.
By his Attorneys.
Williamson & Merchant

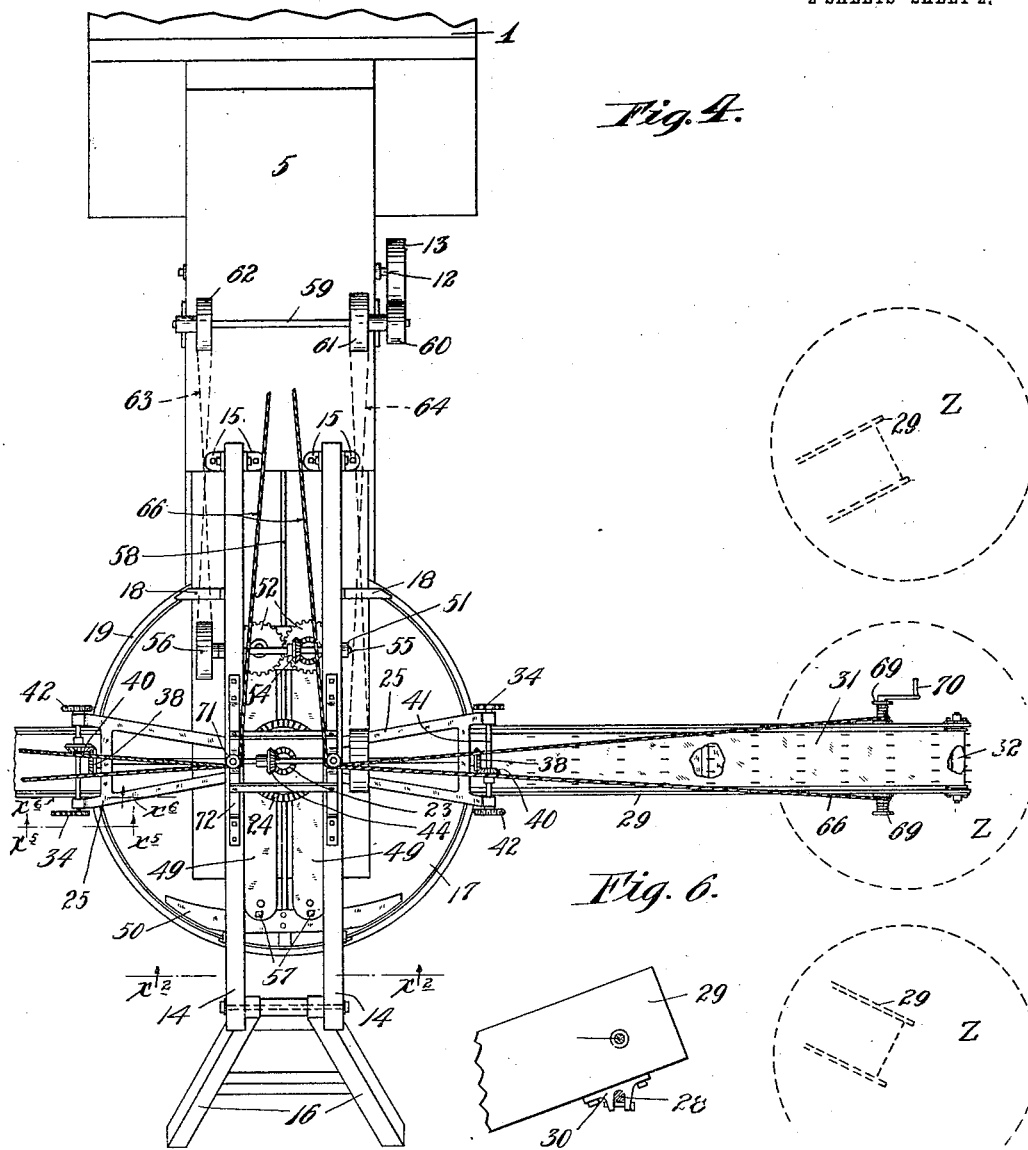

UNITED STATES PATENT OFFICE.

EVALD FRANTZICH, OF KENSINGTON, MINNESOTA.

BUNDLE-CARRYING DEVICE.

No. 808,080.  Specification of Letters Patent.  Patented Dec. 26, 1905.

Application filed April 7, 1905. Serial No. 254,274.

*To all whom it may concern:*

Be it known that I, EVALD FRANTZICH, a citizen of the United States, residing at Kensington, in the county of Douglas and State of Minnesota, have invented certain new and useful Improvements in Bundle-Carrying Devices; and I do hereby declare the following to be a full, clear, and exact description of the invention, such as will enable others skilled in the art to which it appertains to make and use the same.

My invention relates to threshing-machines, and has for its object to provide an improved bundle-feeding device for carrying the bundles from the stack to the band-cutter and feeder.

To the above ends the invention consists of the novel devices and combinations of devices hereinafter described, and defined in the claims.

In the accompanying drawings, which illustrate the invention, like characters indicate like parts throughout the several views.

Figure 1 is a view in side elevation with some parts shown in diagram and with some parts broken away, illustrating my invention applied directly to a band-cutter and feeder of a threshing-machine. Fig. 2 is a transverse vertical section taken on the line $x^2 \, x^2$ of Figs. 1 and 4. Fig. 3 is a detail in transverse section, taken on the line $x^3 \, x^3$ of Fig. 1. Fig. 4 is a plan view of the parts shown in Fig. 1, some parts being broken away and several stacks of grain being indicated diagrammatically by dotted lines. Fig. 5 is a detail view, in front elevation, with some parts broken away looking at the parts located in the vicinity of the line marked $x^5 \, x^5$ of Fig. 4; and Fig. 6 is a detail in vertical section, taken on the line $x^6 \, x^6$ of Fig. 4, some parts being broken away.

Of the parts of the threshing-machine shown in the drawings the numeral 1 indicates the case, and the numeral 2 one of the front wheels, and the numeral 3 the shaft of the threshing-cylinder, which shaft is, as usual, provided with a pulley 4 at one end.

In the drawings a band-cutter and feeder of standard or any suitable construction is shown as applied in the usual way to the threshing-machine in position to deliver the unthreshed grain to the cylinder and concave. This band-cutter and feeder is indicated diagrammatically in the drawings, and its frame is indicated as an entirety by the numeral 5, said frame of course being rigidly secured to the front portion of the case 1. Of the parts of the band-cutter and feeder it is only desirable to note the endless conveyer or feeder proper (indicated by the numeral 6) and the band-cutter shaft 7, which is provided at one end with a pulley 8. The blades of the band-cutter are not shown in the drawings, but may be of the usual or any suitable construction. The feeder-belt 6 runs over suitable guide-rollers 9, 10, and 11, which rollers are mounted in the sides of the frame 5, and in the drawings, Fig. 1, are indicated by dotted lines only. The shaft 12 of the driving-roller 10 is provided at one end with a pulley 13.

My improved feeding attachment is supported by a frame which is adapted to be folded back over the separator when not in use. This folding frame comprises a pair of parallel bars 14, which at their inner ends are pivoted to bearings 15, secured on top of the frame 5. A supporting-leg 16 is pivoted at $16^a$ to the fowardly-projecting ends of the bars 14. A conical feed-hopper 17 overlies the outer portion of the feeder-belt 6, being, as shown, rigidly secured to the horizontally-extended overlying frame-bars 14 by vertical straps 18. The upper edge of the hopper 17 affords an annular track, and for this purpose it is preferably provided with a rigidly-secured laterally-projecting flange 19.

Rigidly secured between and to the frame-bars 14 over the axis of the hopper 17 is a bearing 20, provided with a vertical sleeve 21, in which is journaled a short vertical shaft 22, having at its upper end a miter-gear 23 and at its lower end a bevel-gear 24.

Pivoted on the lower end of the sleeve 21 is a pair of reversely-projecting oscillatory frames 25, the outer ends of which are turned downward and are provided each with three small truck-wheels 26 26 27. The wheels 26 run on top of the track-flange 19 to support the outer ends of the frame 25, and the wheels 27 hold the said wheels 26 down in engagement with the said track-flange. The oscillatory frames 25, with their supporting-wheels, constitute vibratory trucks which carry each one of the improved bundle-conveyers.

The vertical end portions of the truck-frames 25, it will be noted, (see Fig. 1,) are cut away to form large rectangular passages $25^a$. Short horizontal shafts 28 extend across the openings 25ᵃ and are journaled in suitable bearings on the lower portions of the vertical sections of said frames 25. On these shafts 28 the inner ends of long conveyer-frames 29 are pivotally mounted, said frames 29 preferably having prong-bearings 30, which engage said shaft 28, as shown in Fig. 6, to afford a detachable pivotal connection for the said frames 29. Endless belt-conveyers 31 run over rollers 32 and 33, mounted in the ends of the respective frames 29. The shafts of the rollers 33, which are at the inner ends of the supporting-frames 29, are provided at one end with spur-gears 34, that mesh with spur-gears 35 on one end of the shafts 28, heretofore noted. The said shafts 28 at their other ends are provided with sprockets 36.

Extending longitudinally of and mounted in suitable bearings on the vibratory truck-frames 25 are counter-shafts 37, provided at their outer ends with miter-gears 38 and provided at their inner ends with bevel-pinions 39, that mesh with the bevel-gear 24, carried by the vertical counter-shaft 22, as before described. The miter-gears 38 mesh with miter-gears 40, carried by short counter-shafts 41, journaled in the outer portions of the frames 25 above the counter-shafts 28 and provided at one end with sprockets 42. Sprocket-chains 43 run over the corresponding vertically-alined sprockets 36 and 42. The miter-gear 23 on the upper end of the vertical counter-shaft 22 (see particularly Fig. 2) meshes with a miter-gear 44, carried by a counter-shaft 45, journaled in suitable bearings on the hinged frame 14. At one end this shaft 45 is provided with a pulley 46.

Mounted to work in parallel vertical planes over the central portion of the hopper 17 and over the receiving portion of the feeder-belt 6 is a pair of endless reversely-driven feed-belts 47. These feed-belts run over rollers 48, mounted in supporting-frames 49, which frames are pivoted for oscillatory movements, their lower ends being supported by a segmental flange 50, rigidly secured to the rim of the hopper 17. To afford pivots for the upper ends of the frames 49, the shafts of the rollers 48 at the upper ends thereof are journaled in a yoke-like bearing 51, (see particularly Figs. 1 and 3,) rigidly secured to the pivoted frame 14. The upper ends of these roller-shafts are provided with intermeshing spur-gears 52, and one thereof is also provided with a miter-gear 53, that meshes with a miter-gear 54 of a counter-shaft 55, which counter-shaft is journaled in the yoke 51 and is provided at one end with a pulley 56.

The numeral 57 indicates set-screws that work through the lower portion of the upper flanges of the frame and impinge upon the fixed flange 50 to rigidly hold said frames 49 in any set position.

The numeral 58 indicates a divider-board that extends between the two frames 49 and is fixed with respect to the hopper. The said hopper 17 is of course open at that side which is adjacent to the band-cutters.

The numeral 59 indicates a counter-shaft which is mounted in suitable bearings on the upper portion of the feeder-frame 5 and is provided with three pulleys 60, 61, and 62. A crossed belt 63 runs over the pulley 62 and over the pulley 56 of the counter-shaft 55. A crossed belt 64 runs over the pulley 61 and over the pulley 46 of the counter-shaft 45. A belt 65 runs over the pulley 60 and over the pulley 13 of the shaft 12. The said belts 63, 64, and 65 are indicated in the drawings, Figs. 1 and 4, by dotted lines. Said shaft 12 will be driven from the cylinder-shaft 3 in the usual way by means of belts and pulleys. (Not shown.)

To support the free outer ends of the conveyer-frames 29 with freedom for vertical adjustments, while permitting them to be freely moved in a horizontal plane or sidewise from one stack to another, I preferably employ cables 66, that are arranged in pairs, having their upper and rearwardly extended ends attached to a windlass-drum 67, mounted in suitable bearings on the separator-frame 1 and provided with an operating-crank 68. The usual or any suitable means may be provided for locking the drum 67 against rotation. The other ends of said cables 66 are attached to windlass-drums 69, which drums are connected in pairs, are mounted on the outer portions of the respective frames 29, and are provided with a hand-crank 70, by means of which they may be turned. Any suitable means may be provided for locking the drums 69 against rotation. At their intermediate portions the cables 66 run over guide-sheaves 71, mounted on standards 72, rigidly secured on top of the pivoted frame 14. In Fig. 4 the character z indicates several stacks of grain. (Shown by dotted lines.)

As is evident, the outer ends of the endless bundle-conveyers 31 may be given independent vertical and lateral adjustments to adapt them to the stack from which bundles are being fed. It is also evident that through the driving connections described the said conveyers 31 and the conveyers 47 will be driven in the proper directions to carry the bundles onto the feeder-belt 6 and toward the band-cutter. The conveyers 47 engage the ends of the bundles and turn them longitudinally on the feeder-belt 6. When the bundle-conveyer 31 is turned at an acute angle to the separator-case 1, it is desirable to move the free end of the coöperating conveyer 47 outward, so as to maintain the said two coöperating conveyers more nearly at a right angle to each other than would otherwise be the case.

In moving the entire machine from place to place the bundle-conveyers 31 and their frames 29 may be detached, and the supporting-frame 14 and pedestal or leg 16 may be folded together and turned backward over the feeder-frame 5 entirely out of the way. In moving the machine from one "setting" to another it is not, of course, necessary to remove the conveyers 31 and frames 29.

The bundle-feeding device described greatly reduces the amount of labor required in delivering the bundles from the stack to the threshing mechanism.

The mechanism described is of course capable of modification within the scope of my invention as herein set forth and claimed.

What I claim, and desire to secure by Letters Patent of the United States, is as follows:

1. The combination with a threshing-machine and a feeder therefor, of a hopper overlying said feeder, an endless conveyer projecting from said hopper and mounted for oscillatory movements in a horizontal plane, and an endless conveyer set edgewise in a vertical plane, and mounted to travel in a horizontal plane overlying the central portion of said hopper and mounted for oscillatory movements, substantially as described.

2. The combination with a threshing-machine and a feeder therefor, of a hopper overlying said feeder, the upper edge thereof affording an annular track, a pair of truck-frames pivoted at the axis of the hopper and mounted to travel on the track at the upper edge thereof, a pair of conveyer-frames connected at their inner ends to the outer ends of said pivoted truck-frames, and independently supported at their free ends with freedom for vertical adjustments, endless bundle-conveyers mounted on said conveyer-frames, and a pair of reversely-driven conveyers set edgewise in vertical planes and mounted to travel in horizontal planes, overlying the central portion of said hopper, substantially as described.

In testimony whereof I affix my signature in presence of two witnesses.

EVALD FRANTZICH.

Witnesses:
  AUG. BENSON,
  AUG. G. ANDERSON.